(12) United States Patent
Liu et al.

(10) Patent No.: US 7,450,225 B1
(45) Date of Patent: Nov. 11, 2008

(54) CORRECTION OF OPTICAL METROLOGY FOR FOCUS OFFSET

(75) Inventors: Zhuan Liu, Fremont, CA (US); Yudong Hao, Santa Clara, CA (US); Ye Feng, Portland, OR (US); Yongdong Liu, Cupertino, CA (US)

(73) Assignee: Nanometrics Incorporated, Milpitas, CA (US)

( * ) Notice: Subject to any disclaimer, the term of this patent is extended or adjusted under 35 U.S.C. 154(b) by 47 days.

(21) Appl. No.: 11/735,266

(22) Filed: Apr. 13, 2007

(51) Int. Cl.
*G01J 1/00* (2006.01)
*G01B 9/00* (2006.01)

(52) U.S. Cl. .................................. 356/123; 356/125
(58) Field of Classification Search ... 356/243.1–243.8, 356/319, 326, 369, 601–623, 625–632
See application file for complete search history.

(56) References Cited

U.S. PATENT DOCUMENTS

| | | | |
|---|---|---|---|
| 5,307,175 A * | 4/1994 | Seachman | 358/401 |
| 5,880,844 A * | 3/1999 | Seng | 356/613 |
| 6,611,292 B1 * | 8/2003 | Tsai et al. | 348/345 |
| 6,763,141 B2 * | 7/2004 | Xu et al. | 382/255 |
| 7,196,300 B2 | 3/2007 | Watkins et al. | |

* cited by examiner

*Primary Examiner*—L. G. Lauchman
*Assistant Examiner*—Jarreas C Underwood
(74) *Attorney, Agent, or Firm*—Silicon Valley Patent Group LLP

(57) ABSTRACT

A metrology system performs optical metrology while holding a sample with an unknown focus offset. The measurements are corrected by fitting for the focus offset in a model regression analysis. Focus calibration is used to determine the optical response of the metrology device to the focus offset. The modeled data is adjusted based on the optical response to the focus offset and the model regression analysis fits for the focus offset as a variable parameter along with the sample characteristics that are to be measured. Once an adequate fit is determined, the values of the sample characteristics to be measured are reported. The adjusted modeled data may be stored in a library, or alternatively, modeled data may be adjusted in real-time.

33 Claims, 4 Drawing Sheets

CORRECTION OF OPTICAL METROLOGY FOR FOCUS OFFSET

FIELD OF THE INVENTION

The present invention is related to optical metrology and, in particular, to a correction for measurements of a sample made at an unknown offset from the focal position.

BACKGROUND

Optical metrology systems, such as reflectometers, often use refractive optics to focus the radiation onto the sample being measured. With the sample positioned in the focal plane of the optical metrology system, the metrology system can measure the desired parameters of the sample, including, but not limited to such things as the thickness and optical characteristics of the film or films on the sample, as well as critical dimensions (CD). Accordingly, prior to measuring a sample, optical metrology systems generally attempt to place the sample at the focal plane of the optical system. Imprecision in the focusing process contributes to a decrease in the precision and repeatability of the measurement results. Moreover, the focusing process can be time consuming thereby reducing throughput of the system. This is particularly true when a large number of locations on a sample are to be measured and a focal process is performed at each location. Accordingly, improvements are desired.

SUMMARY

In accordance with an embodiment of the present invention, optical metrology is performed on a sample while holding a sample with an unknown focus offset. The measurement is corrected by fitting for the focus offset in a model regression analysis. In one embodiment, a focus calibration is used to determine the optical response of the metrology device to the focus offset. The modeled data is adjusted based on the determined optical response to the focus offset and the model regression analysis fits for the focus offset as a variable parameter along with the sample characteristics that are to be measured. Once an adequate fit is determined, the values of the sample characteristics to be measured are reported, e.g., either stored or displayed. In one embodiment the adjusted modeled data is stored in a library. In another embodiment, modeled data is adjusted based on the optical response to focus offset in a real-time analysis.

DETAILED DESCRIPTION

In accordance with an embodiment of the present invention, a metrology device performs optical metrology while holding a sample at a position with an unknown focus offset and the measurements are corrected by fitting for focus offset in the model regression analysis. Accordingly, the need for a focusing procedure prior to each measurement is eliminated thereby significantly improving throughput and improving multiple measurement precision.

Figure 1:
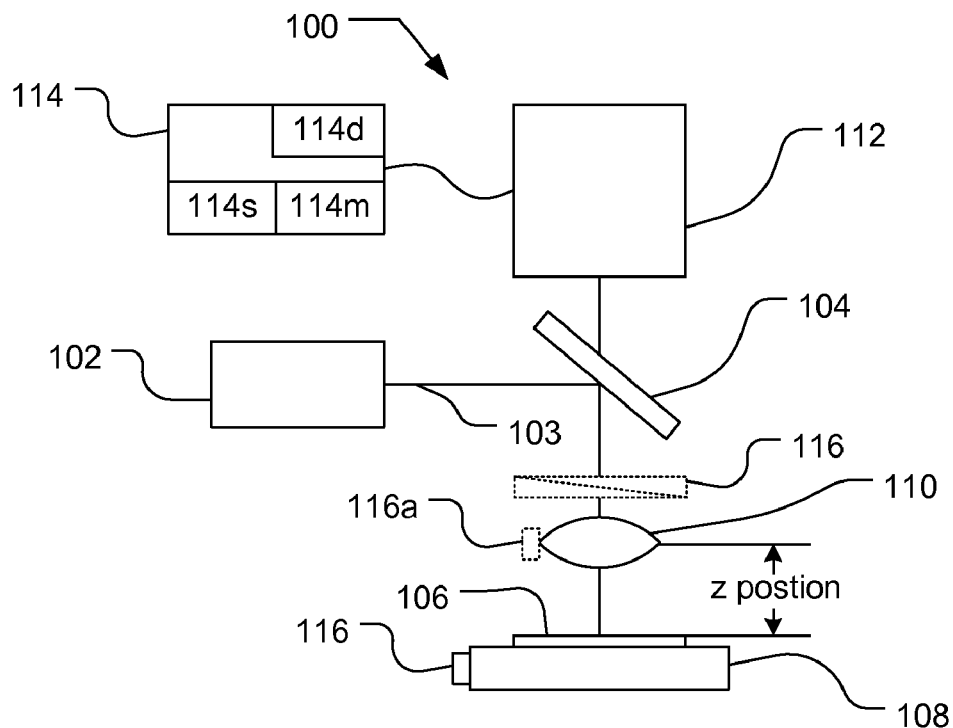
FIG. 1 illustrates an optical metrology system, such as a spectroscopic reflectometer, that may be used in accordance with an embodiment of the present invention.

FIG. 1 illustrates an optical metrology system 100, such as a spectroscopic reflectometer, that may be used in accordance with an embodiment of the present invention. The metrology system 100 includes a broad band light source 102 (or sources) that generates a sample beam 103 that is partially reflected by beam splitter 104 towards the sample 106. Sample 106 may be, e.g., a semiconductor wafer or flat panel display or any other substrate, and is supported by a stage 108, which may be a polar coordinate, i.e., R-θ, stage or an x-y translation stage. The stage 108 is also capable of motion in the vertical direction, known as the z direction. The sample beam 103 is directed towards and focused onto the sample 106, e.g., by an objective lens (or series of lenses) 110. The lens 110 may be dispersive optical system, such as refracting, or reflecting optical systems, but is not limited thereto. The focus procedure may be done by collecting a plurality of images or reflectance spectra of the sample by varying the z positions. The z position at the maximum image contrast or the maximum intensity in a given wavelength range in the spectrum corresponds to the focus position. In one embodiment, the focused beam spot size is smaller than the sample pad size. The beam is reflected off the sample 106 and the reflected light is transmitted through the lens 110 and a portion of the reflected light is transmitted through beam splitter 104 to be received by a spectrophotometer 112. Spectrophotometer 112 is coupled to a processor 114 that includes a computer-readable storage medium 114s or memory storing a computer program executable by the computer, which analyzes the data provided by spectrophotometer 112. The processor 114 may also be used to control the data acquisition and analysis of metrology system 100 as described herein. The processor 114 reports the final or one or more of the preliminary results of the measurements and stores the results in a storage medium 114m or displays the results with a user interface device 114d, such as a display or printer.

It should be understood that the metrology system 100 may include additional elements, such as one or more polarizing elements, e.g., illustrated with broken lines 116, and imaging systems. Moreover, while metrology system 100 is illustrated in FIG. 1 as a reflectometer, other types of metrology devices, such as ellipsometers, profilometers, or other similar types of devices may be used in accordance with an embodiment of the present invention. While the use of broad band light and multi-wavelength analysis is discussed herein, it should be understood that single wavelength light may be used if desired. The metrology system 100 may move the sample 106, i.e., via stage 108, relative to objective lens 110 and/or move the objective lens 110 or the entire optical system relative to the sample 106 to adjust the focus.

During conventional measurements, a focusing procedure is used to place the sample 106 at the focal position in the z direction for the optical system to achieve accurate measurement results and to produce a small spot size. Any deviation from the focal position in the z direction is known as a focus offset. If the sample 106 is held at a non-zero focus offset, the collected spectrum will deviate from the spectrum that would have been collected if the sample 106 were held in the focal position.

Figure 2:
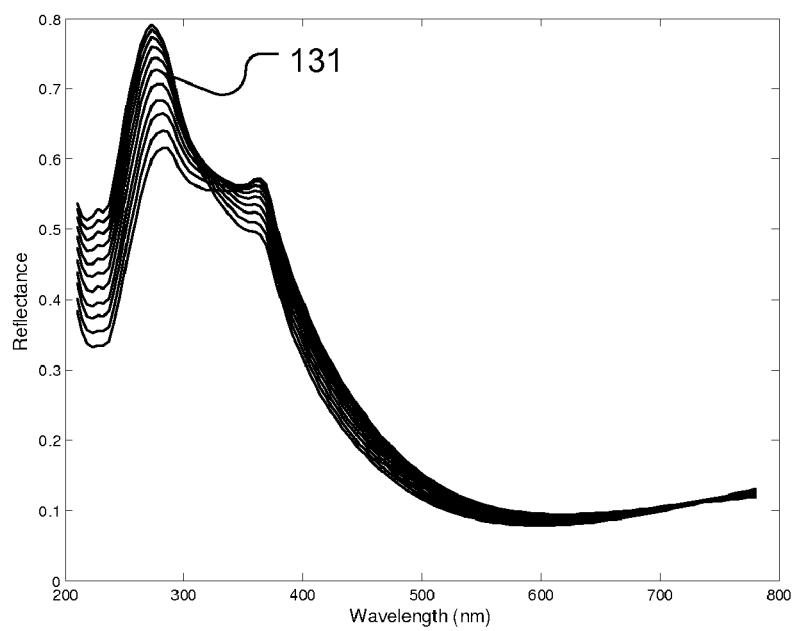
FIG. 2 illustrates spectral variation measured at different focus offsets for a 100 nm Oxide film on a silicon substrate.
Figure 3:
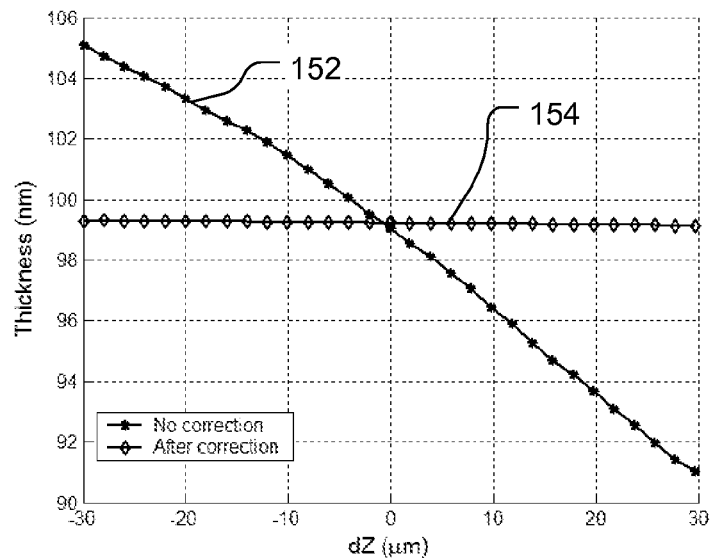
FIG. 3 is a graph illustrating Oxide thickness obtained from a model fit for different focus offsets with and without correction for the focus offsets.

By way of example, FIG. 2 illustrates a spectral variation measured at different Z heights from −30 μm to +30 μm with 6 μm step increments from the in-focus position (illustrated with curve 131) for a 100 nm Oxide film on a silicon substrate. Thus, when a measurement is made at a position with a non-zero focus offset, the parameters extracted from model regression analysis will suffer from inaccuracies. The curve 152 in the graph of FIG. 3, by way of example, illustrates the Oxide thickness obtained from a model fit for different focus offsets. As can be seen, the thickness determined by the model fit varies based on the focus offset value (dZ). Moreover, when the lens 110 includes dispersive optics, such as a refractive lens, the inaccuracies are exacerbated due to the chromatic aberration.

In addition, repeatably achieving a constant focus offset is difficult. Accordingly, when multiple measurements at a single location on a sample are taken after performing a conventional focusing process for each measurement, the focus offset might be slightly different for each measurement. The amount of the variation in the focus offset depends on the lens used and the focusing algorithm and is a partial contributor to the uncertainties of the measurement results due to the different focus offsets for each measurement.

In order to correct for the focus offset of the metrology device without undergoing a time intensive focusing process, the optical response to the focus offset is determined using a focus calibration procedure on the metrology device 100. It should be understood that the focus calibration procedure may be performed on each individual metrology device 100 or, alternatively, it may be performed on a single representative metrology device and generalized to other metrology devices. Focus calibration using only a single representative metrology device may simplify manufacture, but could reduce the ultimate accuracy of the measurements.

Figure 4:
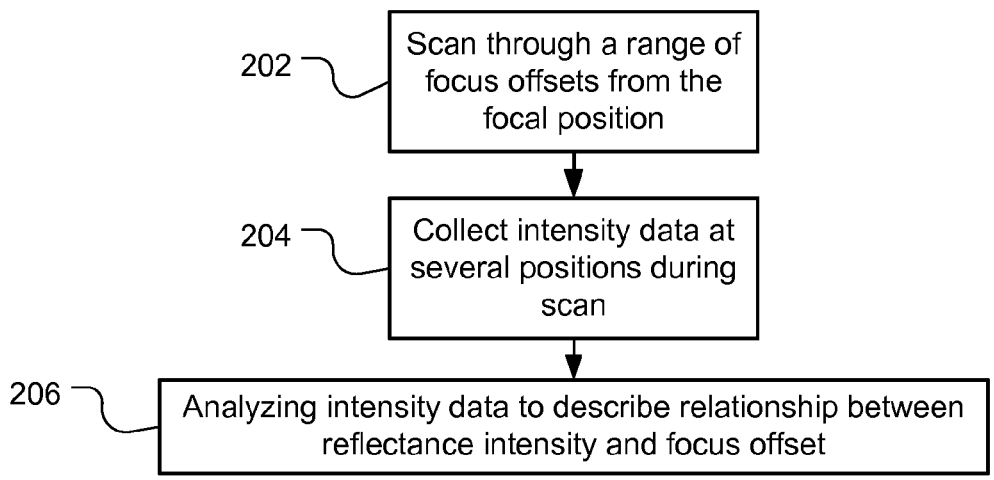
FIG. 4 is a flow chart illustrating a focus calibration procedure to determine the optical response to the focus offset in a metrology device.

FIG. 4 is a flow chart illustrating a focus calibration procedure to determine the optical response to the focus offset in a metrology device, such as metrology device 100 shown in FIG. 1. The metrology device 100 scans through a range of known focus offsets from the focal position (202) and collects intensity (spectral) data from a calibration sample at several positions during the scan (204). The sample may be, e.g., a bare silicon wafer, or, other samples may be used, such as a representative sample of the structure to be measured. The amount of focus offset from the focal position should be known when the intensity data is collected. Thus, a focus procedure should be performed to first obtain the focused position, and the focus offset should be monitored during the collection of intensity data. This may be accomplished in a conventional manner, e.g., using an spectra-based or imaging based focusing process, and the amount of focus offset is monitored, e.g., using an encoder 116 on the stage 108 or on the optical system (illustrated with broken lines 116a) if the optical system is used to adjust the focus. The measurement scan may be performed step-by-step over a range of focus offsets with a step size that will provide adequate resolution. The range should be large enough to include worse case focus offset variation, e.g., ±100 μm, while the step size may be, e.g., 5 μm. If desired, a continuous scan may be used instead of a step-by-step scan, if the system response is fast and/or the scan speed is slow.

Once the intensity (spectra) data is collected, the data is analyzed and the relationship between reflectance intensity and the focus offset at each wavelength is described (206). The description of the relationship between the reflectance intensity and the focus offset at each wavelength may be, e.g., a functional curve, such as a polynomial, Gaussian or other type of function or a look-up table. By way of example, the spectral response to the focus offset may be described by the following Gaussian function $$R_\lambda(dZ) = \left(A_\lambda \exp\left(-\frac{1}{2}\left(\frac{dZ}{\sigma_\lambda}\right)^2\right) + C_\lambda\right) R_\lambda(0) \qquad \text{eq. 1}$$

where dZ is the focus offset from the focused position, $R_\lambda(0)$ is the focused reflectance value at wavelength $\lambda$, $R_\lambda(dZ)$ is the reflectance value at the position with dZ offset, and $A_\lambda$, $\sigma_\lambda$ and $C_\lambda$ are wavelength dependent Gaussian coefficients, which may be determined by fitting the through-focus data to the Gaussian function at each wavelength. Once the focus calibration procedure is complete, the description of the optical response to the focus offset can be used to convert a theoretical spectrum, which is generated with a presumed zero focus offset, into an adjusted spectrum having any desired focus offsets dZ value.

Figure 5:
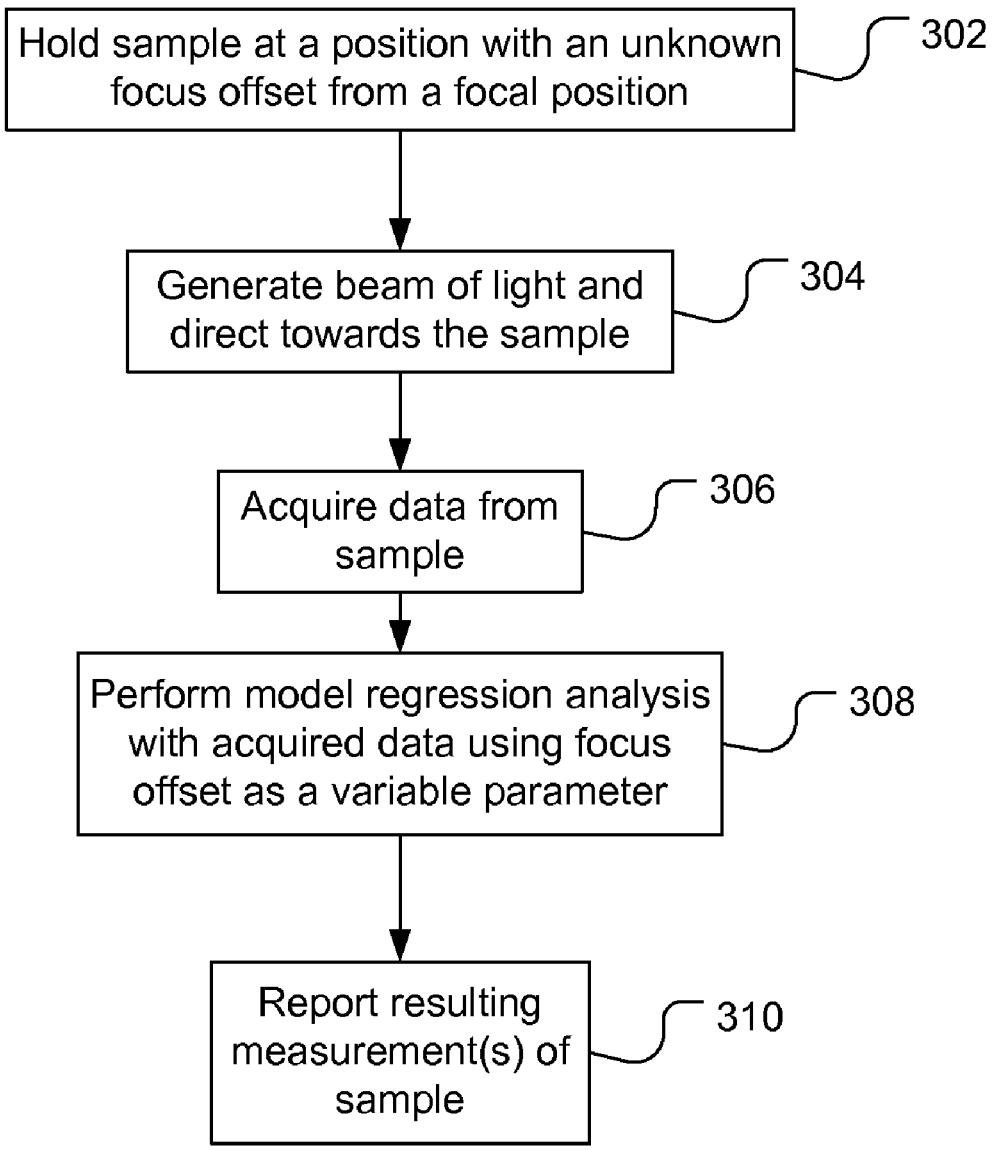
FIG. 5 is a flow chart illustrating the operation of a metrology device using a model regression analysis to fit for the focus offset, along with the sample characteristics to be measured.

During an actual measurement, however, the focus offset dZ is not known. Accordingly, in an embodiment of the present invention, the focus offset dZ is used as a variable parameter along with other model parameters that is fit to in a model regression analysis. FIG. 5 is a flow chart illustrating the operation of a metrology device, such as metrology device 100 in FIG. 1, using a model regression analysis to fit for the focus offset dZ, along with the characteristics to be measured in the sample, such as film thickness, critical dimension, sidewall angle, etc.

As illustrated in FIG. 5, the sample is held at a position with an unknown focus offset from the focal position. The focus offset is unknown because the focusing procedure is not performed. It should be understood, however, that while a gross focusing procedure may be employed, e.g., using a conventional spectra-based or imaging based focusing procedure, the time consuming operation of fine focus adjustment need not be performed.

The light source 102 generates a beam of light and the light is directed towards the sample, e.g., by beam splitter 104 and objective lens 110 (304). Intensity data, such as spectral data, is then acquired (306). Other types of data, such as ellipsometry or scattering information may be used, but for the sake of simplicity, the present disclosure will refer to spectral information. Thus, by way of example, the incident light is reflected from the sample and the resulting reflected light is detected from which the intensity data is acquired.

The processor 114 performs a model regression analysis with the acquired data (308). As is well understood in the art, the model regression analysis fits for the characteristic(s) of the sample to be measured, such as film thickness, critical dimension, sidewall angle, etc. The model regression analysis includes generating a model of the sample using a variable parameter(s) for the characteristics to be measured and generating modeled data based on the modeled sample along with the known characteristics of the metrology device 100, such as wavelength(s) and angle of incidence of the light. By iteratively comparing of the acquired data with the modeled data and changing in the values of the variable parameters in the model sample to produce the modeled data, a best fit for the variable parameters and, thus, the characteristics to be measured may be determined. In addition, in accordance with an embodiment of the present invention, the focus offset from the focal position of the metrology device 100 is also used as a variable parameter in the model regression analysis (308).

Once a best fit for the variable parameters is found, the results are reported by the processor as the desired measurement of the sample. By way of example, the results may be stored in storage medium 114*m* or alternatively displayed by display or printer 114*d*. If desired, the focus offset of the metrology device may also be reported, however, typically the end-user is concerned only with the measurements of the sample 106, not the performance of the metrology device 100.

Figure 6:
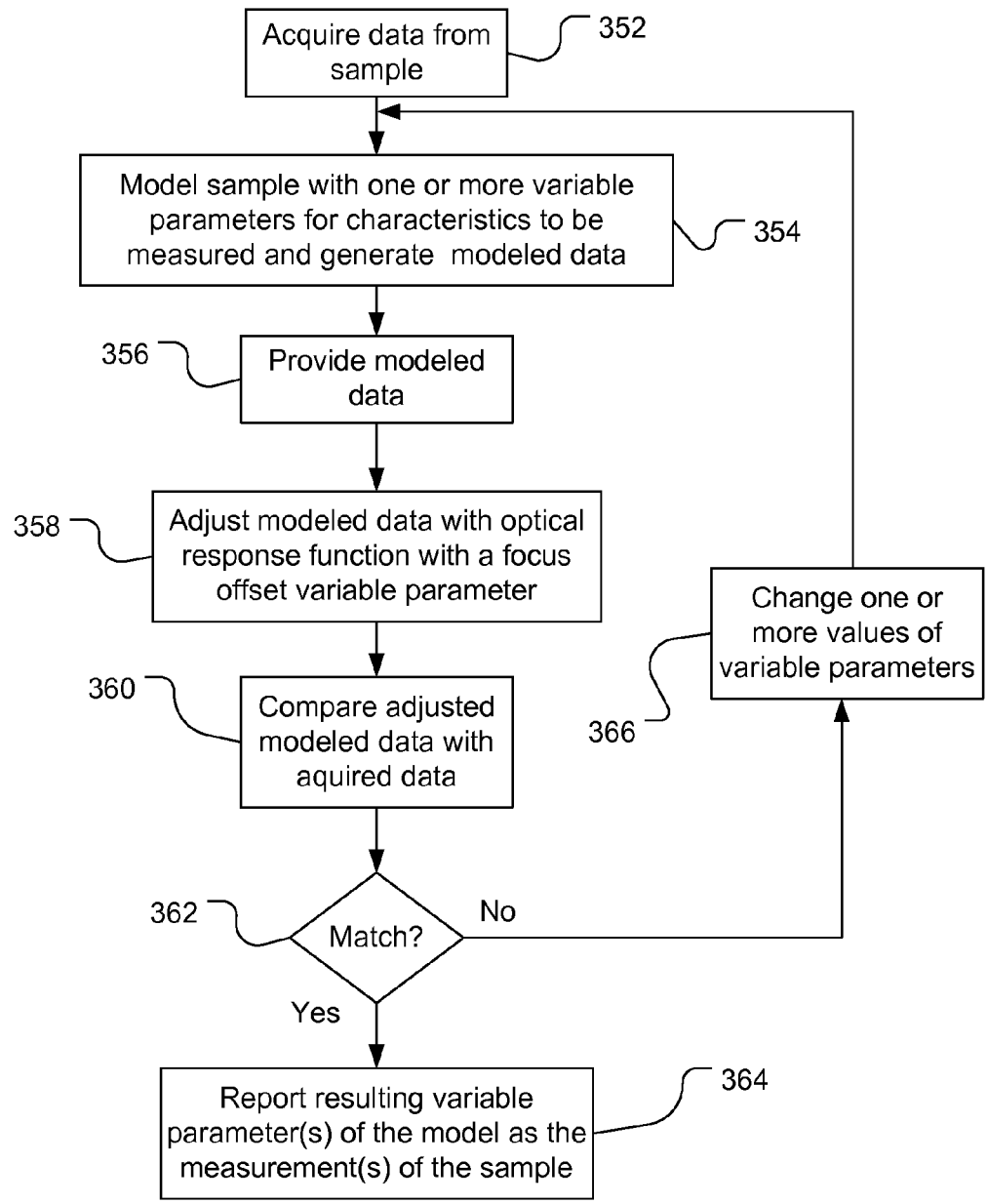
FIG. 6 is a flow chart illustrating a real-time focus offset fit in the model regression analysis.

The fitting for the focus offset variable parameter may be performed using a real time model regression analysis or using a library. FIG. 6 is a flow chart illustrating one embodiment of a real-time focus offset fit in the model regression analysis. As illustrated in FIG. 6, the data is acquired from the sample (352). A model of the sample with one or more variable parameters for the measured characteristics is generated along with the modeled data (354). Modeling a sample and generating modeled data based on the known parameters of the metrology device, e.g., wavelengths and angle of incidence, is a well known process that is dependent on the particular type of sample being measured, the characteristics of the sample to be determined and the metrology device being used. The sample model and modeled data may be stored in library and may be, either mathematically modeled or empirically modeled. Alternatively, the sample model and modeled data may be generated in real-time.

The modeled data for a model having a particular value(s) of variable parameter(s) is provided (356) and the modeled data is adjusted using the description of the optical response to the focus offset determined from the focus calibration procedure, wherein the value of the focus offset is a variable parameter (358). The adjusted modeled data is then compared to the acquired data (360) and an evaluation of the match is performed (362) to determine whether the adjusted modeled data is adequately close to the acquired data. The evaluation of the match may be performed using the Mean-Squared Error (MSE) between the adjusted modeled data and the acquired data as follows:

$$MSE = \sum_\lambda \left( \left( A_\lambda \exp\left(-\frac{1}{2}\left(\frac{dZ}{\sigma_\lambda}\right)^2\right) + C_\lambda \right) R_\lambda^{model} - R_\lambda^{exp} \right)^2 \quad \text{eq. 2}$$

where $R_\lambda^{model}$ is the modeled reflectance value at wavelength $\lambda$, $R_\lambda^{exp}$ is the acquired intensity value at wavelength $\lambda$. Thus, as can be seen in equation 2, the process of adjusting the modeled data (358), comparing the adjusted modeled data with the acquired data (360) and determining if it is a match (362) may be performed in one action. If the MSE value is, e.g., below a desired threshold, the adjusted modeled data and acquired data may be considered a match. In this case, the model is considered to be accurate and the values of the variable parameters used in the model are reported as the measurements for the sample (364). By way of example, the variable parameters for the sample may be displayed to the end-user or stored. The focus offset may also, but need not be reported to the end user.

If the MSE value is too large, there is no match and the process adjusts the parameters in the model (366) and the regression returns to providing modeled data (356), adjusting the modeled data (358), comparing the adjusted modeled data and acquired data (360), and determining if the match is adequate (362). In one embodiment, the MSE is minimized for the focus offset variable parameter together with other model parameters. In this manner, the regression process will automatically determine both sample parameters, such as thicknesses, CDs, sidewall angles, etc., and the focus offset.

In another embodiment, the fitting for the focus offset variable parameter may be performed using a library. Before data is acquired, a library is generated and saved in the storage medium 114*m*, that includes a number of models of the sample with different values for the variable parameters (384). The library also includes the modeled data for each model in the sample, where the modeled data is adjusted for a plurality of values of the focus offset (384). By way of example, the adjusted modeled data may be generated by calculating the theoretical modeled data for a sample model and converting the theoretical modeled data using equation 1 above for a plurality of values of the focus offset.

After the sample data is acquired, the adjusted modeled data is provided by searching the library to find the best match between the adjusted data and the acquired data, and it is determined whether the match is adequate in a manner similar to that discussed above. If the match is adequate, e.g., the MSE is below a threshold, the results are reported as discussed above. However, if the match is not adequate, the process may continue with regression either using real time or library interpolation around the parameter values obtained from the library search by slightly varying one or more different values of the variable parameters, such as the focus offset. This regression analysis continues until an adequate fit is determined.

Accordingly, an accurate measurement of sample parameters can be extracted from measurements taken from non-zero focus offsets by modeling and fitting for the focus offset. Referring back to FIG. 3, curve 154 illustrates the Oxide thickness obtained from a model fit for different focus offsets after correction for the focus offset. As can be seen, the Oxide thickness is no longer dependent on the focus offset.

This method can also be extended to acquiring more than one spectrum at the measurement location, each at a different dZ focus offset. These spectra may be used simultaneously in the regression process to determine the model parameters and focus offsets with improved precision. Simultaneous fitting of these spectra allows constraining the focus offsets with a known dZ difference between measurements, which can be obtained through external means, such as an encoder 116 on the stage or the optical system (illustrated with broken lines 116*a*) if the optical system is used to adjust the focus. This constraint helps to decouple focus offset contribution from other model parameters. A minimum of two spectra will have to be acquired for this improved precision.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of determining at least one characteristic of a sample, the method comprising:
   holding the sample at a position having an unknown focus offset from a focal position;
   providing a beam of light;
   directing the beam of light towards the sample;
   collecting intensity data from the sample;
   performing a model regression analysis with the collected intensity data and in which the model regression analysis uses the focus offset as a variable parameter and the at least one characteristic of the sample as a variable parameter to determine the at least one characteristic of the sample; and reporting the determined at least one characteristic of the sample.

2. The method of claim 1, wherein reporting the determined at least one characteristic of the sample comprises storing or displaying the determined at least one characteristic of the sample.

3. The method of claim 1, wherein providing a beam of light comprises providing broad band light and wherein collecting intensity data comprises collecting spectral data.

4. The method of claim 1, further comprising performing a focus calibration to determine the optical response to the focus offset from a focal position, the focus calibration comprising:
  providing a beam of light;
  directing the beam of light towards a calibration sample;
  scanning the calibration sample through a range of focus offsets from the focal position;
  collecting intensity data from the calibration sample at a plurality of focus offset positions;
  generating a description of the collected intensity data with respect to the focus offset; and
  storing the description of the collected intensity data with respect to the focus offset, wherein the description of the collected intensity data with respect to the focus offset is used in the model regression analysis.

5. The method of claim 4, wherein the beam of light is broad band light, the collected intensity data is spectral data, and wherein the description of the collected intensity data is the response for each wavelength with respect to the focus offset.

6. The method of claim 4, wherein the description of the collected intensity data with respect to the focus offset is at least one of a functional curve and a lookup table.

7. The method of claim 5, wherein the functional curve is one of a polynomial and a Gaussian function.

8. The method of claim 4, wherein the description of the collected intensity data with respect to the focus offset is used to generate a library that is used in the model regression analysis.

9. The method of claim 4, wherein the description of the collected intensity data with respect to the focus offset is used to fit for at least the focus offset variable parameter in real-time.

10. The method of claim 4, wherein scanning the calibration sample through a range of focus offsets from the focal position comprises moving at least one of the calibration sample and at least one component in an optical system with respect to the other.

11. The method of claim 1, wherein performing a model regression analysis with the collected intensity data comprises:
  providing a model of the sample with the at least one characteristic of the sample being a variable parameter;
  providing intensity data for the model for different values of the at least one characteristic of the sample;
  adjusting the provided intensity data for the model with different values of the focus offset;
  iteratively comparing the collected intensity data and the adjusted intensity data until an adequate match is achieved; and
  reporting the value variable parameter for the at least one characteristic of the sample.

12. The method of claim 11, wherein the model of the sample and intensity data for the model are stored in a library and wherein providing intensity data comprises providing the intensity data from the library.

13. The method of claim 12, wherein the model of the sample and adjusted intensity data are stored in a library.

14. The method of claim 11, wherein adjusting the provided intensity data is performed in real time while iteratively comparing.

15. The method of claim 11, wherein providing a model and providing intensity data for the model are performed in real time.

16. The method of claim 1, wherein the collected intensity data is a first set of intensity data, the method further comprising
  changing the focus offset to a different unknown focus offset; and
  collecting a second set of intensity data from the sample at the different unknown focus offset;
  wherein performing a model regression analysis uses both the first set of intensity data and the second set of intensity data.

17. An apparatus for measuring at least one characteristic of a sample, the apparatus comprising:
  a light source that produces a light beam;
  an optical system for directing the beam of light towards a sample, the optical system having a focal position with respect to the sample;
  a stage for holding a sample with an unknown focus offset from the focal position;
  a detector for collecting intensity data from the light beam after interacting with the sample; and
  a processor coupled to the detector, the processor having a computer-readable storage medium storing a computer program executable by said processor, the computer program comprising computer instructions for performing a model regression analysis with collected intensity data, the model regression analysis uses focus offset as a variable parameter and the at least one characteristic of the sample as a variable parameter to determine the at least one characteristic of the sample, the processor further having a storage medium, wherein the determined at least one characteristic of the sample is reported to and stored in the storage medium.

18. The apparatus of claim 17, wherein the processor is coupled to a display and the determined at least one characteristic of the sample is reported to and shown on the display.

19. The apparatus of claim 17, wherein the optical system is at least one of a refractive lens and a reflective optical element.

20. The apparatus of claim 17, wherein the light source us a broad band light source and the detector is a spectrophotometer.

21. The apparatus of claim 17, wherein the processor comprises a storage media that stores a library for use with the model regression analysis, the library including intensity data that is adjusted for different values of focus offset.

22. The apparatus of claim 17, wherein performing a model regression analysis comprises comparing the collected intensity data and the intensity data calculated from a model of the sample and adjusted based on different values of focus offset.

23. The apparatus of claim 22, wherein performing a model regression analysis comprises adjusting the intensity data calculated from a model using a focus calibration function that relates the optical response to the focus offset from a focal position.

24. The apparatus of claim 17, wherein the apparatus is at least one of a reflectometer, ellipsometer, and profilometer.

25. The apparatus of claim 17, wherein performing a model regression analysis comprises using at least two sets of collected intensity data each taken with a different unknown focus offset.

26. The apparatus of claim 25, further comprising an encoder coupled to one of the stage and optically system to measure the distance between the focus offset used for each set of collected intensity data.

27. A method of determining the optical response to the focus offset from a focal position in an optical metrology device, the method comprising:
providing a beam of light;
directing the beam of light towards a calibration sample;
scanning the calibration sample through a range of focus offsets from the focal position;
collecting intensity data from the calibration sample at a plurality of focus offset positions;
generating a description of the collected intensity data with respect to the focus offset; and
storing the description of the collected intensity data with respect to the focus offset as the optical response to the focus offset from a focal position in an optical metrology device.

28. The method of claim 27, wherein the optical response to the focus offset from a focal position in an optical metrology device is used in a model regression analysis to measure at least one characteristic of a sample, the model regression analysis using focus offset as a variable parameter.

29. The method of claim 27, wherein the beam of light is broad band light, the collected intensity data is spectral data, and wherein the description of the collected intensity data is the response for each wavelength with respect to the focus offset.

30. The method of claim 27, wherein the description of the collected intensity data with respect to the focus offset is at least one of a functional curve and a lookup table.

31. The method of claim 30, wherein the functional curve is one of a polynomial and a Gaussian function.

32. The method of claim 27, wherein the description of the collected intensity data with respect to the focus offset is used to generate a library of sample model data.

33. The method of claim 27, wherein scanning the calibration sample through a range of focus offsets from the focal position comprises moving at least one of the calibration sample and at least one component in an optical system with respect to the other.

* * * * *